United States Patent [19]
Stover et al.

[11] Patent Number: 5,722,155
[45] Date of Patent: Mar. 3, 1998

[54] MACHINING GUIDE METHOD FOR MAGNETIC RECORDING REPRODUCE HEADS

[75] Inventors: Lance E. Stover, Eden Prairie; Beat G. Keel, Prior Lake; Shanlin X. Hao, St. Paul, all of Minn.

[73] Assignee: Seagate Technology, Inc., Scotts Valley, Calif.

[21] Appl. No.: 629,524

[22] Filed: Apr. 10, 1996

Related U.S. Application Data

[60] Provisional application No. 60/009,761, Jan. 11, 1996.

[51] Int. Cl.$^6$ ............... G11B 5/127; G11B 5/39; B24B 49/02
[52] U.S. Cl. ............ 29/603.1; 29/603.16; 360/113; 451/5
[58] Field of Search ............... 29/603.09, 603.1, 29/603.16, 593; 451/1, 5, 259, 364; 360/113, 122; 324/252

[56] References Cited

U.S. PATENT DOCUMENTS

| | | | |
|---|---|---|---|
| 3,710,235 | 1/1973 | Barrager et al. | 29/603.09 X |
| 4,457,114 | 7/1984 | Hennenfent et al. | 451/364 X |
| 4,477,968 | 10/1984 | Kracke et al. | 29/603 |
| 4,536,992 | 8/1985 | Hennenfent et al. | 451/259 |
| 4,559,743 | 12/1985 | Kracke et al. | 451/1 X |
| 4,689,877 | 9/1987 | Church | 29/603.1 |
| 4,912,883 | 4/1990 | Chang et al. | 451/1 |
| 5,023,991 | 6/1991 | Smith | 29/603 |
| 5,065,483 | 11/1991 | Zammit | 29/603.09 |
| 5,175,938 | 1/1993 | Smith | 29/603.09 X |
| 5,361,547 | 11/1994 | Church et al. | 451/5 |
| 5,463,805 | 11/1995 | Mowry et al. | 29/603.09 |

OTHER PUBLICATIONS

G.P. Carver, L.W. Linholm, and T.J. Russell, "Use of Microelectronic Test Structures to Characterize IC Materials, Processes, and Processing Equipment*" *Solid State Technology*, Sep., 1990, pp. 85–92.

*Primary Examiner*—Peter Vo
*Attorney, Agent, or Firm*—Westman, Champlin & Kelly, P.A.

[57] ABSTRACT

An electrical lap guide (ELG) and a method of using the same to control the machining of a surface of a magnetic transducer to obtain a desired transducer height are disclosed. The transducer and ELG are fabricated in a deposition of layers on a substrate. The ELG includes a first resistor aligned with the transducer such that a machined height of the first resistor is indicative of a machined height of the transducer. Resistances of second and third resistors of the ELG are measured. A sheet resistance of the deposition of layers and a quantity of wafer processing edge movement are determined as functions of the measured resistances of the second and third resistors. An expected non-machined resistance of the first resistor is determined as a function of the determined sheet resistance and as a function of the determined quantity of edge movement. A non-machined resistance of the first resistor is measured. The expected non-machined resistance of the first resistor is compared to the measured non-machined resistance of the first resistor to determine an amount of error.

12 Claims, 4 Drawing Sheets

MACHINING GUIDE METHOD FOR MAGNETIC RECORDING REPRODUCE HEADS

BACKGROUND OF THE INVENTION

The present application claims the benefit of earlier filed U.S. Provisional Application No. 60/009.761, entitled MACHINE GUIDE FOR MAGNETORESISTIVE REPRODUCE HEADS, filed on Jan. 11, 1996.

The present invention relates generally to the fabrication of magnetoresistive (MR) and inductive reproduce sensors or transducers for data storage applications, and more particularly, to an improved electrical lap guide (ELG) which controls the machining process such that the transducers are machined to a specified height.

During the fabrication of magnetic heads for use in magnetic data storage applications, an array of transducers and auxiliary circuits are fabricated on a common substrate in a deposition of metallic and non-metallic layers. The auxiliary circuits are sometimes referred to as electrical lap guides (ELGs). Patterning of the array of transducers and ELGs is accomplished using photolithography in combination with etching and lift-off processes. The finished array or wafer is then optically and electrically inspected and subsequently cut into smaller arrays, rows or bars. Next, individual rows or bars of transducers and ELGs are machined, at a surface which will eventually face the recording medium, to obtain a desired MR transducer height (sometimes referred to as the stripe height SH) or to obtain a desired inductive transducer height (sometimes referred to as the throat height TH).

During machining of a particular row of transducers and ELGs, the machined surface moves from a beginning position to a final position, while reducing the height of the transducers. The primary function of the ELG(s) is to control the machining process such that the desired transducer height is achieved. After a particular row of transducers is machined to the desired transducer height as controlled by the ELG(s), the rows or bars are cut or diced into individual recording heads or sliders. During this process, the ELG(s) can be destroyed if desired.

Typically, each ELG includes one or two resistors which are fabricated in the deposition of layers along with the transducers. A very simple ELG design has one resistor which is aligned with a transducer such that the machining process reduces the height of both the transducer and the resistor at the same time. The resistance of the machined resistor is monitored to determine when the desired height of the transducer has been achieved so that the machining process can be halted at this point. A more complex ELG design includes two resistors, one machined and the other a non-machined reference resistor. The resistance of the machined resistor is compared to the constant resistance of the reference resistor during the machining process. When the resistance of the machined resistor equals the resistance of the reference resistor, the machining process is halted, presumably at the point where the height of the machined resistor is approximately equal to the desired transducer height.

Numerous problems and difficulties are introduced with conventional ELG designs. One very common problem with conventional ELG designs is that they do not adequately account for errors introduced by the existence of mask or contact edge movement (also known as edge movement A) caused by wafer processing steps. The edge movement phenomena caused by wafer processing results in the transducer and the resistors of the ELG being reduced or expanded in size as surfaces or edges of these elements move by a quantity $\Delta$. Thus, the actual lengths and heights of these elements will frequently be substantially different than the intended lengths and heights (i.e., than the mask lengths and heights). The dimension changes in the transducer and in the resistors of the ELG introduce errors in the machining process. For example, if the resistance of the reference resistor is dimensionally changed by edge movement, comparison of its resistance to the resistance of the machined resistor will result in the machining process being halted at the wrong time.

Failed attempts in the prior art to address the effects of edge movement on ELG performance made ELG performance wafer processing sensitive. Therefore, there is a need for an improved ELG design which both adequately compensates for the effects of wafer processing edge movement and which provides a method for determining the accuracy and/or trustworthiness of the ELG design.

SUMMARY OF THE INVENTION

An electrical lap guide (ELG) having three resistors and a method of using the same to control the machining of a surface of a magnetoresistive or inductive transducer to obtain a desired transducer height are disclosed. The transducer and ELG are fabricated in a deposition of layers on a substrate. The ELG includes a first resistor aligned with the transducer such that a machined height of the first resistor is indicative of a machined height of the transducer. A second non-machined resistor is substantially wider than a third non-machined resistor. Sheet resistance of the resistor material and a quantity of wafer processing edge movement are determined as functions of the measured resistances of the second and third resistors. Once actual sheet resistance and edge movement are computed from the measured resistances of the second and third resistors, an expected resistance of the first resistor can be computed prior to machining of the first resistor. Resistance of the not yet machined first resistor is measured and compared with the computed resistance of the first resistor to determine an amount of error. A small error is indicative of the trustworthiness of the ELG.

During the machining process, the resistance of the first resistor is monitored as the height of the first resistor is reduced. The machined height of the first resistor is determined as a function of the determined sheet resistance and as a function of the monitored resistance of the first resistor. The transducer and the first resistor are machined until the height of the first resistor is substantially equal to a desired height.

DETAILED DESCRIPTION OF THE PREFERRED EMBODIMENTS

The ELG and method of the present invention are discussed below with reference to examples in which a desired stripe height of an MR transducer is achieved. However, it will be clear to those of ordinary skill in the art that the ELG and method of the present invention can be used to control a machining process to achieve a desired inductive transducer throat height as well.

Figure 1:
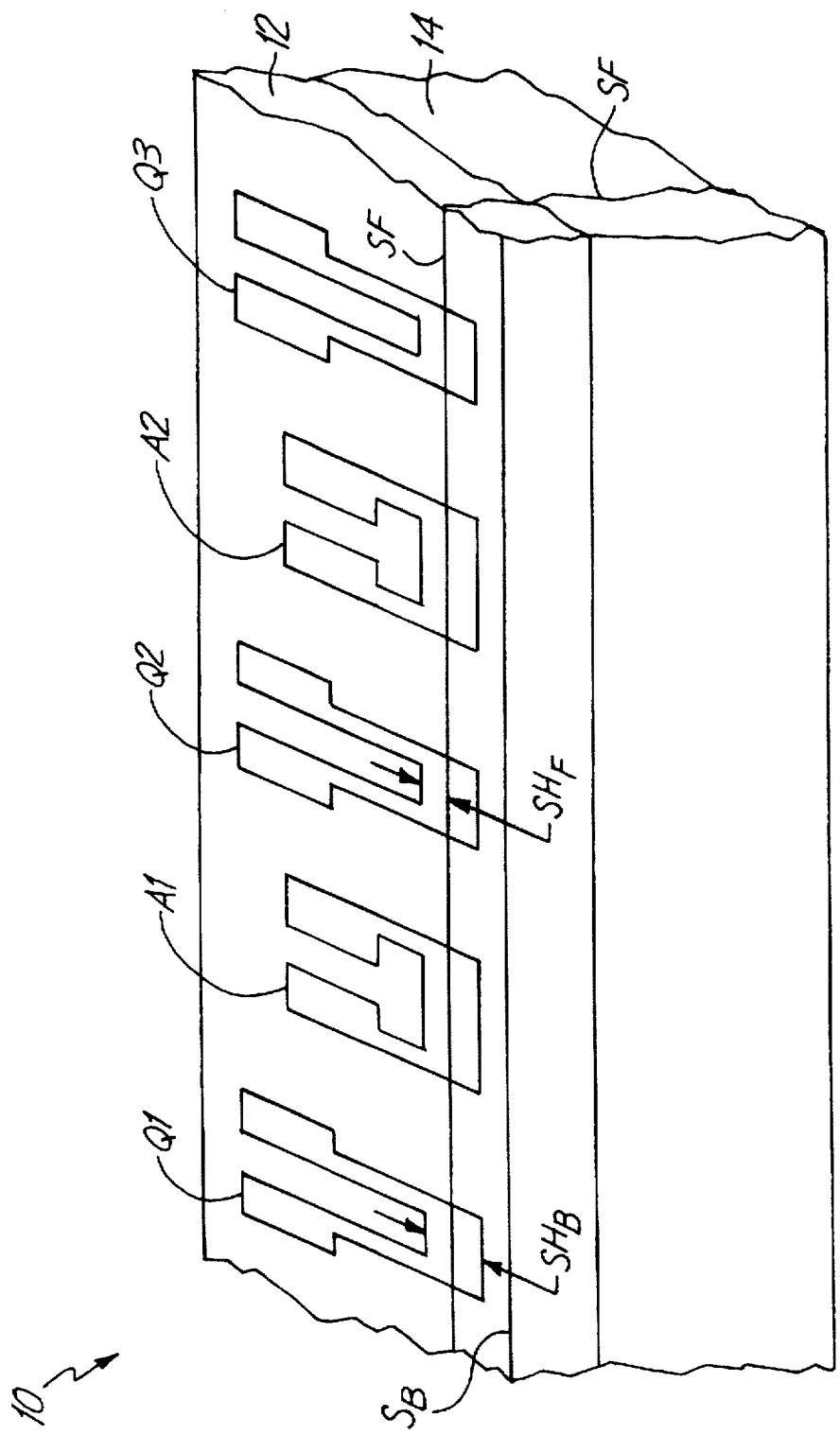
FIG. 1 is a diagrammatic view in perspective of a row of MR transducers and auxiliary circuits or ELG(s) which is to be machined to achieve a desired height of the MR transducers.

FIG. 1 is a diagrammatic view of row or bar which contains an array of MR sensors or transducers (only MR transducers Q1, Q2 and Q3 are shown) and auxiliary circuits (only auxiliary circuits A1 and A2 are shown). Each ELG conventionally includes several resistors. The MR transducers and auxiliary circuits are deposited in layers 12 formed on substrate 14. Although illustrated diagrammatically as being two-dimensional in FIG. 1, the MR transducers and auxiliary circuits are multi-layered devices having a finite thickness and which are covered with an overcoat layer (not shown). As is well-known in the art, the ELGs or auxiliary circuits are used to control the machining process, while a surface of row 10 is machined from beginning surface $S_B$ to final surface $S_F$ to reduce the height of the MR transducers from beginning height $SH_B$ to final height $SH_F$.

Figure 2:
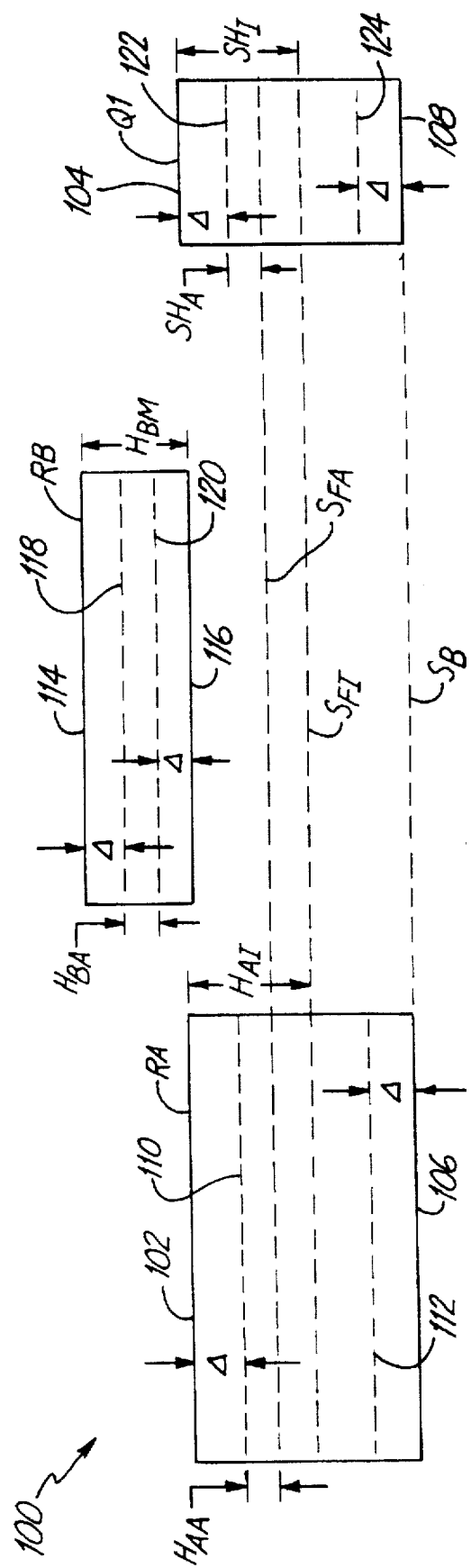
FIG. 2 is a diagrammatic view of a prior art ELG for controlling the machining process which illustrates the effects of wafer processing edge movement on the final MR transducer height.

FIG. 2 is a diagrammatic view of prior art ELG 100 which is used to control the machining or lapping process while attempting to achieve an intended or desired height $SH_I$ of MR transducer Q1. ELG 100 includes first resistor RA and reference resistor RB. Rear surface 102 of first resistor RA is aligned with rear surface 104 of MR transducer Q1. With rear surfaces 102 and 104 aligned, height $H_A$ (illustrated as intended height $H_{AI}$ and actual height $H_{AA}$) of resistor RA and height SH (illustrated as intended height $SH_I$ and actual height $SH_A$) of MR transducer Q1 will be equal as the machining surface moves from its beginning position $S_B$, aligned with front surface 106 of resistor RA and front surface 108 of MR transducer Q1, back toward final machining surface $S_F$ (illustrated as intended final surface $S_{FI}$ and actual final surface $S_{FA}$). As the heights of resistor RA and MR transducer Q1 are reduced by the machining process, resistance $R_A$ of resistor RA increases. When measured resistance $R_A$ of resistor RA equals measured resistance $R_B$ of reference resistor RB, the machining process is stopped.

Ideally, when the machining process has caused resistance $R_A$ of resistor RA to be equal to resistance $R_B$ of reference resistor RB, resistor RA would have achieved its intended or ideal height $H_{AI}$. At this ideal height of resistor RA, MR transducer Q1 would have its intended or ideal height $SH_I$. However, the effects of wafer processing edge movement (designated by the quantity $\Delta$ in FIG. 2) causes significant error in the actual machined heights of resistor RA and MR transducer Q1.

As can be seen in FIG. 2, wafer processing edge movement has caused back and front edges 102 and 106, respectively, of resistor RA to move by amount $\Delta$ to new positions 110 and 112. Likewise, rear and front edges 114 and 116 of reference resistor RB have moved to new positions 118 and 120. Finally, wafer processing edge movement has moved rear and front edges 104 and 108 of MR transducer Q1 to new positions 122 and 124. Although not illustrated, similar movement of edges of RA, RB and Q1 occurs in the length direction as well.

Because of the wafer processing edge movement, the height of reference resistor RB has changed from mask height $H_{BM}$ to actual height $H_{BA}$. The change in the height of resistor RB causes a change in resistance of resistor RB. Therefore, when the machining process is halted because measured resistance $R_A$ of resistor RA has become substantially equal to measured resistance $R_B$ of resistor RB, resistor RA will have an actual machined height $H_{AA}$ which is different from its intended machined height $H_{AI}$. Consequently, MR transducer Q1 will have an actual machined height $SH_A$ which is different from its intended machined height $SH_I$. Attempts in the prior art to compensate for this error have fallen short. One particular disadvantage of prior art ELGs, which attempt to compensate for the effects of edge movement on the calculation of the heights of machined resistor RA and of MR transducer Q1, is that variations in the measured resistances and other parameters prevents the ELG design from being reliably used in machining a large number of MR transducers. Further, many prior art ELG designs simply neglect the quantity $\Delta$ of edge movement in order to approximate the height of MR transducer Q1.

Figure 3:
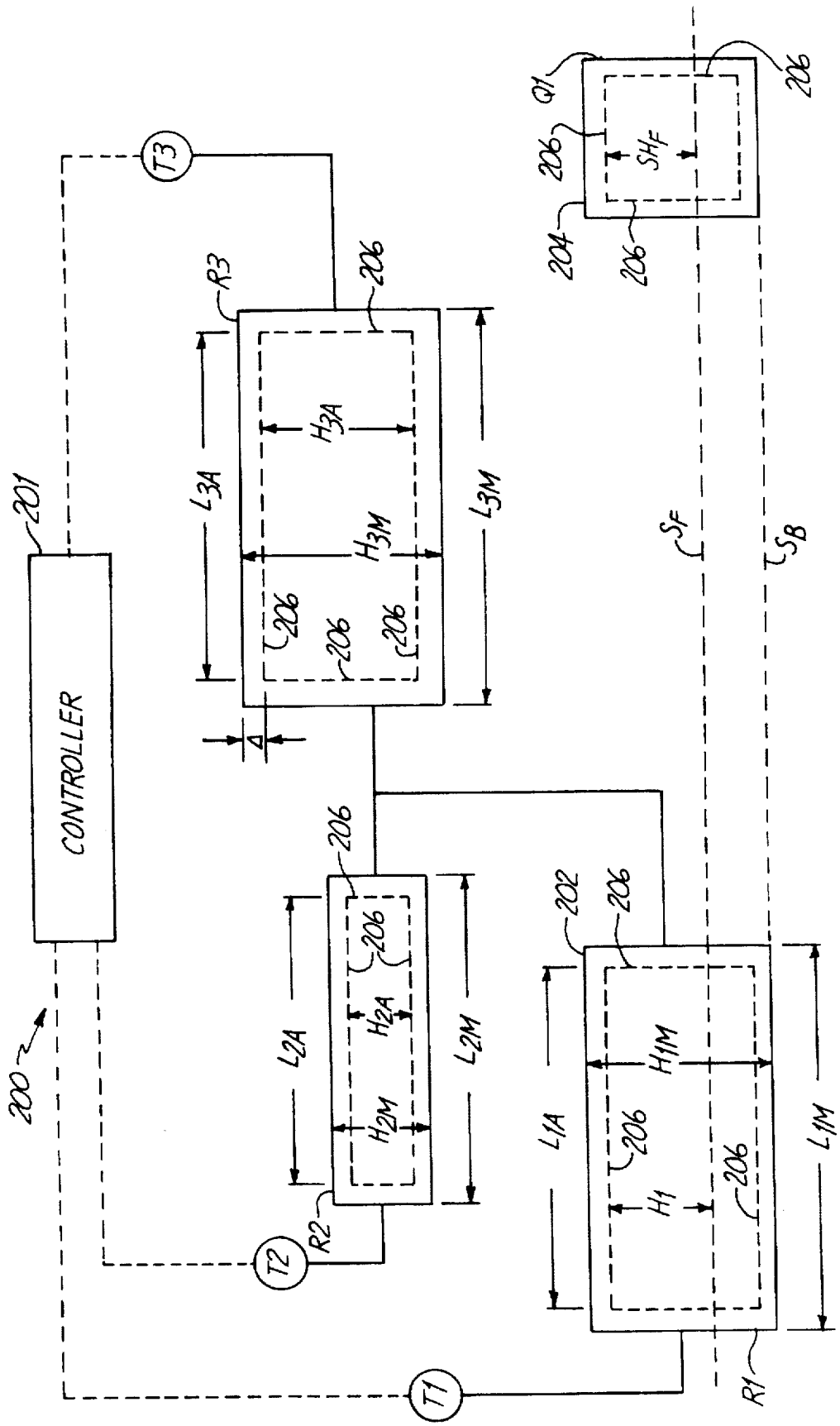
FIG. 3 is a diagrammatic view of a new ELG design in accordance with preferred embodiments of the present invention which is used to control the machining process to obtain the desired MR transducer height, while accounting for the effects of wafer processing edge movement and providing the ability to monitor the trustworthiness of the ELG operation and design.

FIG. 3 is a diagrammatic illustration of ELG 200 which can be used to control the machining process to obtain the desired or intended final height $SH_F$ of MR transducer Q1 by accurately and reliably taking into account the effects of wafer process edge movement. ELG 200 provides the ability to determine the accuracy or reliability of the ELG design for use with each transducer or with groups of transducers such that MR transducers and their associated ELGs can be discarded if excessive errors in the manufacturing process are deemed likely.

ELG 200 includes first or analog resistor R1, reference resistor R2, and additional reference resistor R3. In preferred embodiments, resistors R1, R2 and R3 are connected to each other as shown and to electrical terminals T1, T2 and T3 such that the resistances of each of the three resistors can be measured or determined from a series of resistance measurements. However, in other embodiments, still other configurations and numbers of electrical terminals can be used to ensure that the resistances of each of the three resistors of ELG 200 can be measured or determined.

In some preferred embodiments, ELG 200 also includes controller 201. In other embodiments, controller 201 is used in conjunction with ELG 200 as part of an ELG system. Controller 201 is coupled to each of electrical terminals T1, T2 and T3. In preferred embodiments, controller 201 is a microprocessor based control device having associated memory and associated input/output circuitry and devices. However, in other embodiments, controller 201 can be any of a variety of analog or digital based circuits or components adapted for measuring the resistances of resistors R1, R2 and R3 and for controlling the machining process as a function of the measured resistances to achieve the desired machined height of MR transducer Q1. Although not expressly stated throughout, it should be understood that controller 201 performs the various calculations and functions required in preferred methods of the present invention and discussed below.

Resistor R1 of ELG 200 is preferably aligned with MR transducer Q1 such that rear surface 202 of resistor R1 lies in the same plane as rear surface 204 of MR transducer Q1. The machining or lapping process begins at or near beginning surface $S_B$ and is continued until final surface $S_F$ is reached. Ideally, the machining process is controlled such that machined resistor height $H_1$ of resistor R1 is equal to some predetermined value at which final height $SH_F$ of MR transducer Q1 is equal to its desired level. Reference resistors R2 and R3 are preferably, but not necessarily recessed from the machined surface.

As discussed above, edge movement (denoted by quantity $\Delta$ in FIG. 3) of edge surfaces of resistors R1, R2 and R3 and of MR transducer Q1 changes the dimensions of these components. As shown in FIG. 3, the quantity $\Delta$ of edge movement is assumed to be approximately equal for each of the components. Further, it is assumed that quantity $\Delta$ of edge movement is approximately the same in the height and length directions. Although edge movement in the length direction is only illustrated in FIG. 3, ELG 200 shown in FIG. 2 experiences edge movement in both the height and length directions as well. For ease of illustration, dotted lines 206 are included in FIG. 3 to show edge movement which has reduced the dimensions of the components. However, it must be noted that edge movement can enlarge the dimensions of the components as well.

Resistor R1 has intended or mask length $L_{1M}$ and an actual length $L_{1A}$ which is less than mask length $L_{1M}$ by $2\Delta$. Likewise, resistor R1 has un-machined mask height $H_{1M}$, which would be the un-machined height of resistor R1 if not for edge movement. Resistor R2 has intended or mask length $L_{2M}$ and actual length $L_{2A}$ which is less than the mask length by $2\Delta$. Likewise, resistor R2 has mask height $H_{2M}$ and actual height $H_{2A}$. Resistor R3 has mask and actual lengths $L_{3M}$ and $L_{3A}$, and mask and actual heights $H_{3M}$ and $H_{3A}$.

As stated above, typical resistors also have edge movement in the length direction as shown in FIG. 3. However, since the quantity of edge movement is very small relative to typical resistor lengths, it can be neglected and the resistor lengths can be assumed to be process insensitive. Furthermore, by making $L_3 \times H_2 = L_{2x}H_3$, the calculation of sheet resistance Q and edge movement $\Delta$ discussed below are made insensitive to small and equal changes in $L_2$ and $L_3$. Also, it must be noted that in actual layouts, the resistors may not be rectangular. In these instances, the resistor lengths referred to herein are intended to be the effective resistor lengths as can be calculated using a finite element method (FEM) or numerical modeling.

As discussed previously, ELGs of the type illustrated in FIGS. 2 and 3 control final machined height $SH_F$ of MR transducer Q1 by monitoring or controlling machined height $H_1$ of resistor R1. Typically, this is done by measuring and monitoring resistance $R_1$ of resistor R1. As discussed previously, conventional ELGs of the type which compare measured resistance $R_1$ of resistor R1 to a reference resistance as resistor R1 and MR transducer Q1 are machined typically introduce a significant amount of edge movement related error.

ELG 200 of the present invention overcomes the limitations of conventional ELG designs in compensating or accounting for edge movement. The objective of ELGs of this type is to accurately calculate machined height $H_1$ of resistor R1, which is indicative of final machined height $SH_F$ of MR transducer Q1. If sheet resistance Q of deposition of layers 12 is known, machined height $H_1$ of resistor R1 can be determined using the relationship described in Equation 1.

$$R_1 = \frac{Q \cdot L_1}{H_1} \qquad \text{Equation 1}$$

where, $R_1$ = measured resistance of resistor R1
$L_1$ = effective length of resistor R1
    = $L_{1M} - 2\Delta = L_{1A}$
    $\approx L_{1M}$ when $L_{1m} \gg \Delta$
$H_1$ = machined height of resistor R1

Sheet resistance Q can be determined in a variety of manners. A device for measuring sheet resistance Q which is known in the art is described by G. P. Carver in "Use of Microelectric Test Structures to Characterize IC Materials, Processes and Processing Equipment," Solid State Technology, September 1980. In the alternative, sheet resistance Q can be determined by measuring resistance $R_2$ of reference resistor R2 and using the relationship described below in Equation 2.

$$R_2 = \frac{Q \cdot L_2}{H_{2M} - 2 \cdot \Delta} \qquad \text{Equation 2}$$

where, $R_2$ = measured resistance of resistor R2
$L_2$ = effective length of resistor R2
    = $L_{2M} - 2\Delta = L_{2A}$
    $\approx L_{2M}$ when $L_{2M} \gg \Delta$
$H_{2M}$ = mask height of resistor R2

Since amount or quantity $\Delta$ of edge movement is not known, sheet resistance Q can be estimated using Equation 2 if mask height $H_{2M}$ of resistor R2 is much greater in value than amount $\Delta$ of edge movement, by assuming that amount $\Delta$ of edge movement is equal to zero. Obviously, determination of sheet resistance Q in this manner introduces errors in the calculations.

ELG 200 of the present invention includes third resistor R3 to provide an improved method of determining the value of sheet resistance Q, and to provide a method of determining quantity or amount $\Delta$ of wafer processing edge movement. The ability to determine both sheet resistance Q and quantity $\Delta$ of edge movement increases the reliability of ELG 200. Since measured resistance $R_3$ of resistor R3 is dependent upon both sheet resistance Q and quantity $\Delta$ of edge movement as shown in Equation 3, Equations 2 and 3 can be combined to determine sheet resistance Q and edge movement $\Delta$ as shown in Equations 4 and 5.

$$R_3 = \frac{Q \cdot L_3}{H_{3M} - 2\Delta} \qquad \text{Equation 3}$$

where, $R_3$ = the measured resistance of resistor R3
$L_3$ = the effective length of resistor R3
    = $L_{3M} - 2\Delta = L_{3A}$
    $\approx L_{3M}$ when $L_{3M} \gg \Delta$
$H_{3M}$ = the mask height of resistor R3

$$Q = \frac{H_{3M} - H_{2M}}{\frac{L_3}{R_3} - \frac{L_2}{R_2}} \qquad \text{Equation 4}$$

$$\Delta = \frac{L_2 \cdot H_{3M} - \frac{R_2}{R_3} \cdot L_3 \cdot H_{2M}}{2 \cdot \left(L_2 - \frac{R_2}{R_3} \cdot L_3\right)} \qquad \text{Equation 5}$$

Note that lengths $L_2$ and $L_3$ of resistors R2 and R3, respectively, can be approximated using mask lengths $L_{2M}$ and $L_{3M}$ when the mask lengths are much greater than quantity $\Delta$ of edge movement. Equations 4 and 5 reflect this approximation. However, to reduce errors even further, actual values of lengths $L_2$ and $L_3$, including the effects of edge movement, can be used instead. In other words, length $L_2$ in Equation 2 can be replaced with $L_{2M}-2\Delta$ and length $L_2$ in Equation 3 can be replaced with $L_{3M}-2\Delta$. However, as discussed previously, designing $L_3 \times H_2 = L_2 \times H_3$ makes calculations of sheet resistance Q insensitive to changes in $L_2$ and $L_3$. In preferred embodiments, this sensitivity is reduced by designing $L_2 \times H_3 = K_1 \times L_3 \times H_2$ (where $0.7 < K_1 < 1.3$). For ease of illustration, the present invention is discussed hereafter using the approximation reflected in Equations 4 and 5. However, the present invention is not limited to embodiments using this approximation.

Further, to reduce errors in the calculations discussed herein, $H_{2M}$ should be designed satisfy the relationship $H_{2M} = K_2 H_{3M}$ (where $K_2$ is a constant having a value such that $K_2 > 2$ or such that $K_2 < 0.5$). Placing this limitation on the width ratio of resistors R2 and R3 is preferred to reduce calculation errors. Substituting Equation 4 for Q in Equation 1, height $H_1$ of resistor R1 can be determined as shown in Equation 6.

$$H_1 = \frac{H_{3M} - H_{2M}}{\frac{L_3}{R_3} - \frac{L_2}{R_2}} \cdot \frac{L_1}{R_1} = \frac{L_1 \cdot (H_{3M} - H_{2M})}{L_3 \cdot \frac{R_1}{R_3} - L_2 \cdot \frac{R_1}{R_2}} \qquad \text{Equation 6}$$

Determination of height $H_1$ of resistor R1 using Equation 6 inherently takes into account the effects of edge movement. Thus, by measuring resistances $R_2$ and $R_3$ of reference resistors R2 and R3 prior to machining, and by monitoring resistance $R_1$ of resistor R1 during machining, the machining process can be controlled using the relation ship of Equation 6 to accurately achieve desired height $H_1$ of resistor R1, and thus, desired height $SH_F$ of MR transducer Q1.

Another aspect of the present invention is that the accuracy and reliability of ELG 200 can be determined prior to the machining process for each ELG or row of ELGs if desired. Since sheet resistance Q, quantity $\Delta$ of edge movement, length $L_1$ (as an approximation $L_{1M}$ or as an actual length $L_{1A}$) and mask height $H_{1M}$ of resistor R1 are known, the model provided in Equation 1 can be used to calculate predicted or computed un-machined resistance $R_{1COMP}$ of resistor R1 as shown in Equation 7.

$$R_{1COMP} = \frac{Q \cdot L_1}{H_{1M} - 2\Delta} \qquad \text{Equation 7}$$

Calculation of $R_{1COMP}$ is preferably done at the wafer probe stage, or any time prior to machining. Next, also prior to machining, un-machined resistance $R_{1MEAS}$ of resistor R1 is measured. If the difference or amount of error between $R_{1MEAS}$ and $R_{1COMP}$ is greater than some specified amount or limit, the particular ELG can be excluded from use in machining control. For example, the limit can be established such that an error or difference of greater than 5% results in the ELG being excluded from machining control. In the alternative, errors greater than a predetermined limit can result in the MR transducer being discarded as well. Differences in measured resistance $R_{1MEAS}$ and computed resistance $R_{1COMP}$ can be caused by a variety of factors, including errors in the resistance measurements of one or more of resistors R1, R2 and R3. One method of determining the error between measured resistance $R_{1MEAS}$ and computed resistance $R_{1COMP}$ is shown as an example in Equation 8.

$$\text{ERROR} = \frac{100 \cdot (R_{1MEAS} - R_{1COMP})}{R_{1MEAS}} \qquad \text{Equation 8}$$

In preferred embodiments, the amount of error between $R_{1MEAS}$ and $R_{1COMP}$ is monitored during the wafer probe process step. The mean error and the sigma error over the wafer can then be computed for each wafer. Thus, the present invention provides the ability to monitor the trustworthiness and/or reliability of the ELG design as it applies to individual ELGs and/or as it applies to an entire wafer or row of ELGs.

Figure 4:
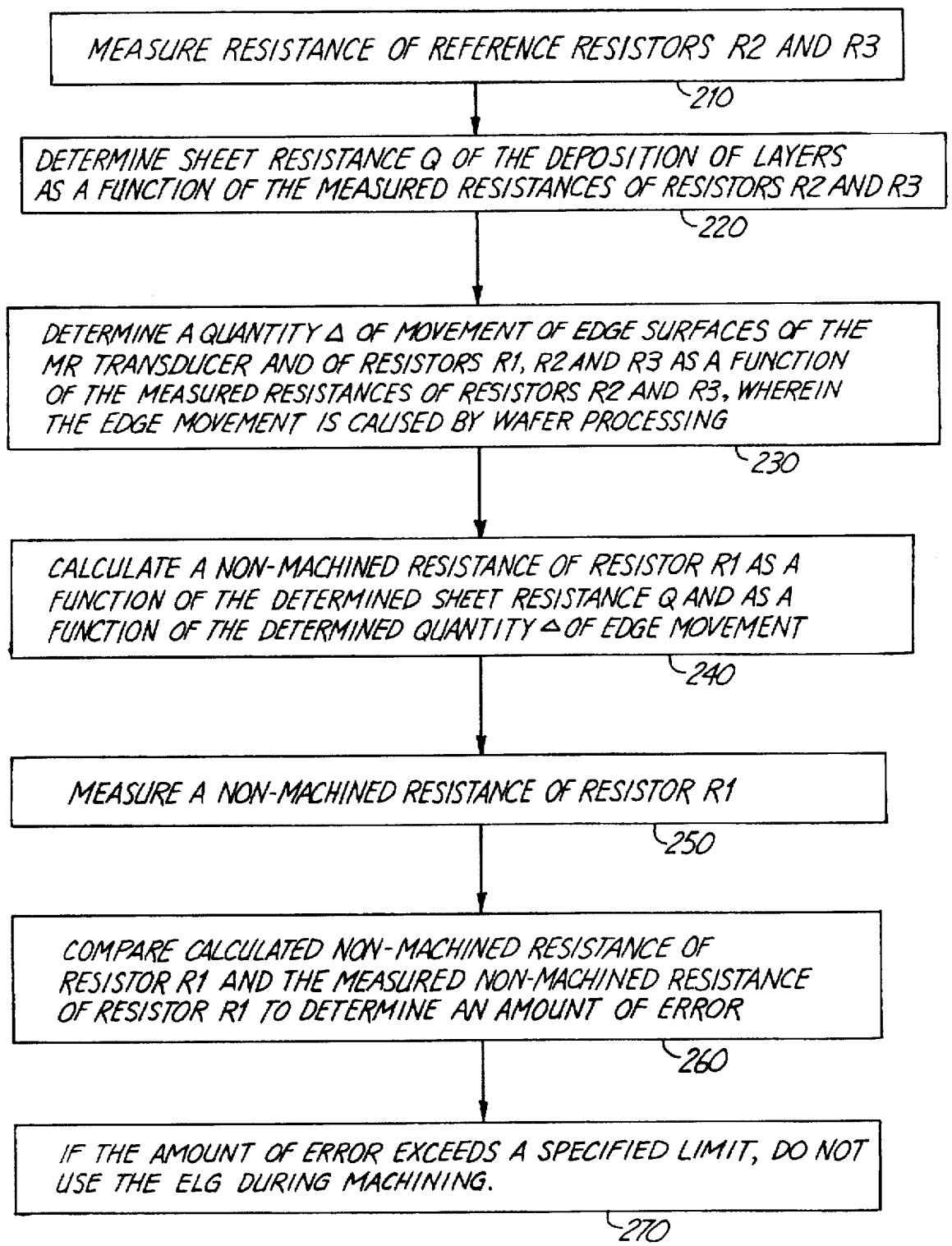
FIG. 4 is a flow diagram illustrating a preferred method of using the new three resistor ELG of the present invention.

FIG. 4 is a flow diagram which illustrates a preferred method of using ELG 200 in accordance with some preferred embodiments of the present invention. In these preferred embodiments, ELG 200 is used as described in the following discussion with reference to the blocks of the flow diagram in FIG. 4.

Block 210

First, resistances $R_2$ and $R_3$ of reference resistors R2 and R3 are measured. In the preferred embodiment illustrated in FIG. 3, this is accomplished by using terminals T1, T2 and T3.

Step 220

Next, sheet resistance Q of deposition of layers 12 is determined as a function of measured resistances $R_2$ and $R_3$ of resistors R2 and R3, using a relationship such as the one described in Equation 4 above. In preferred embodiments, mask heights $H_{2M}$ and $H_{3M}$ and mask lengths $L_{2M}$ and $L_{3M}$ of resistors R2 and R3 must be known. Lengths $L_2$ and $L_3$ of resistors R2 and R3 can be approximations if mask lengths $L_{2M}$ and $L_{3M}$ are much greater than quantity $\Delta$ of edge movement. Making $L_2 \times H_3 = L_3 \times H_2$ further increases the accuracy of computed sheet resistance Q.

Block 230

Next, quantity $\Delta$ of wafer processing edge movement is determined as a function of measured resistances $R_2$ and $R_3$ of resistors R2 and R3. Quantity $\Delta$ of edge movement can be determined using Equation 5 described above. Once again, lengths $L_2$ and $L_3$ used in Equation 5 can be approximated using the mask lengths of resistors R2 and R3 if these lengths are substantially greater than quantity $\Delta$.

Block 240

Next, predicted non-machined resistance $R_{1COMP}$ is calculated as a function of the determined value of sheet resistance Q and as a function of the determined quantity $\Delta$ of edge movement using the relationship described in Equation 7.

Block 250

Next, non-machined resistance $R_{1MEAS}$ of resistor R1 is measured or determined. In preferred embodiments, non-machined resistance $R_{1MEAS}$ is determined using a combination of resistance measurements taken at terminals T1, T2 and T3.

Block 260

Next, predicted non-machined resistance $R_{1COMP}$ is compared to measured non-machined resistance $R_{1MEAS}$ to determine an amount or quantity of error.

Block 270

Finally, if the amount of error between measured resistance value $R_{1MEAS}$ and computed resistance value $R_{1COMP}$ exceeds a predetermined amount or quantity of error, the particular ELG is not used in the height prediction of associated MR transducers. In these cases, height of a particular MR transducer can often be estimated from the height of neighboring transducers. If the amount of error does not exceed the predetermined amount of error, the front surface of MR transducer Q1 and of resistor R1 are machined or lapped until machined height $H_1$ of resistor R1 is substantially equal to a predetermined height. At this predetermined height of resistor R1, final height $SH_F$ of MR transducer Q1 is at the desired transducer height. If the count of usable ELGs per bar or row falls below a predetermined limit, the bar is not machined.

Although the present invention has been described with reference to preferred embodiments, workers skilled in the art will recognize that changes may be made in form and detail without departing from the spirit and scope of the invention.

What is claimed is:

1. A method of using an electrical lap guide (ELG) associated with a magnetic transducer prior to machining a front surface of the transducer to obtain a desired transducer height, the transducer and ELG being fabricated in a deposition of layers on a substrate, the ELG including a first resistor being aligned with the transducer such that a machined height of the first resistor is indicative of a machined height of the transducer, the ELG also including second and third resistors, the method comprising:

measuring resistances of the second and third resistors;

determining a sheet resistance of the deposition of layers as a function of the measured resistances of the second and third resistors;

determining a quantity of edge movement of edge surfaces of the transducer and of the first, second and third resistors as a function of the measured resistances of the second and third resistors, wherein the edge movement is caused by wafer processing;

calculating a predicted non-machined resistance of the first resistor as a function of the determined sheet resistance and as a function of the determined quantity of edge movement;

measuring a non-machined resistance of the first resistor; and comparing the predicted non-machined resistance of the first resistor and the measured non-machined resistance of the first resistor to determine an amount of error.

2. The method of claim 1, wherein the step of determining the sheet resistance of the deposition of layers as a function of the measured resistances of the second and third resistors further comprises determining the sheet resistance of the deposition of layers as a function of the measured resistances of the second and third resistors and as a function of lengths of the second and third resistors.

3. The method of claim 2, wherein the step of determining the sheet resistance of the deposition of layers as a function of the measured resistances of the second and third resistors and as a function of lengths of the second and third resistors further comprises determining the sheet resistance of the deposition of layers as a function of the measured resistances of the second and third resistors, as a function of the lengths of the second and third resistors, and as a function of heights of the second and third resistors.

4. The method of claim 3, wherein determining the sheet resistance of the deposition of layers as a function of heights of the second and third resistors further comprises determining the sheet resistance of the deposition of layers as a function of mask heights of the second and third resistors, wherein the mask heights of the second and third resistors are intended heights of the second and third resistors.

5. The method of claim 1, wherein determining the quantity of edge movement further comprises determining the quantity of edge movement as a function of the measured resistances of the second and third resistors and as a function of lengths of the second and third resistors.

6. The method of claim 5, wherein determining the quantity of edge movement further comprises determining the quantity of edge movement as a function of the measured resistances of the second and third resistors, as a function of lengths of the second and third resistors, and as a function of mask heights of the second and third resistors, wherein the mask heights of the second and third resistors are intended heights of the second and third resistors.

7. The method of claim 1, wherein calculating the predicted non-machined resistance of the first resistor further comprises calculating the non-machined resistance of the first resistor as a function of the determined sheet resistance, as a function of the determined quantity of edge movement, as a function of a length of the first resistor, and as a function of a mask height of the first resistor, wherein the mask height of the first resistor is an intended non-machined height of the first resistor.

8. The method of claim 1, wherein comparing the predicted non-machined resistance of the first resistor and the measured non-machined resistance of the first resistor to determine an amount of error further comprises determining a percent difference between the predicted non-machined resistance of the first resistor and the measured non-machined resistance of the first resistor.

9. The method of claim 1, and further comprising the step of discarding the transducer and the ELG prior to machining if the amount of error exceeds a predetermined amount of error.

10. The method of claim 9, and if the amount of error does not exceed the predetermined amount of error, further comprising the step of machining the front surface of the transducer and a front surface of the first resistor until the machined height of the first resistor is substantially equal to a predetermined first resistor machined height, wherein the machined height of the first resistor is determined as a function of the measured resistance of the first resistor and as a function of the sheet resistance of the deposition of layers.

11. The method of claim 1, wherein the magnetic transducer is a magnetoresistive transducer.

12. A method of processing a magnetic sensor, the sensor and an electrical lap guide (ELG) being fabricated in a deposition of layers on a substrate, the ELG including first, second and third resistors, the method comprising:

measuring resistances of the second and third resistors;

determining a sheet resistance of the deposition of layers as a function of the measured resistances of the second and third resistors;

determining a quantity of edge movement of edge surfaces of the sensor and of the first, second and third resistors as a function of the measured resistances of the second and third resistors, wherein the edge movement is movement of the edge surfaces of the sensor and of the first, second and third resistors caused by previous processing steps;

calculating an expected non-machined resistance of the first resistor as a function of the determined sheet resistance and as a function of the determined quantity of edge movement;

measuring a non-machined resistance of the first resistor;

comparing the expected non-machined resistance of the first resistor to the measured non-machined resistance of the first resistor to determine an amount of error; and machining a surface of the deposition of layers if the determined amount of error is less than a predetermined amount of error, wherein one of the first, second and third resistors is aligned with the sensor such that a machined height of the one of the resistors is indicative of a machined height of the sensor, wherein a machined resistance of the one of the resistors is monitored during the machining, the machined height of the one of the resistors being determined as a function of the determined sheet resistance and as a function of the monitored machined resistance of the one of the resistors, wherein the sensor and the one of the resistors are machined until the machined height of the one of the resistors is substantially equal to a predetermined height.

* * * * *